United States Patent
Wong

(10) Patent No.: US 10,105,854 B1
(45) Date of Patent: Oct. 23, 2018

(54) GRIPPER-MOUNTING MECHANISM

(71) Applicant: HIWIN TECHNOLOGIES CORP., Taichung (TW)

(72) Inventor: Chen-Ming Wong, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 15/492,178

(22) Filed: Apr. 20, 2017

(51) Int. Cl.
*B25J 15/02* (2006.01)
(52) U.S. Cl.
CPC .................. *B25J 15/026* (2013.01)
(58) Field of Classification Search
CPC ..... B25J 15/0253; B25J 15/026; B25J 15/086
USPC ........................................ 294/119.1
See application file for complete search history.

(56) References Cited

U.S. PATENT DOCUMENTS

| | | | | |
|---|---|---|---|---|
| 4,579,380 A * | 4/1986 | Zaremsky | ............. | B25J 13/082 294/119.1 |
| 4,865,301 A * | 9/1989 | Ise | ......................... | B23Q 7/043 269/34 |
| 5,184,861 A * | 2/1993 | Voellmer | ............... | B25J 15/026 294/119.1 |
| 6,505,871 B2 * | 1/2003 | McCormick | ........... | B25J 15/028 294/119.1 |
| 7,044,706 B2 * | 5/2006 | Jung | .................... | B25J 15/0052 294/119.1 |
| 8,246,027 B2 * | 8/2012 | Li | ......................... | B25J 15/026 269/225 |
| 8,408,619 B2 * | 4/2013 | Murakami | ............... | B25J 15/10 294/119.1 |
| 8,939,487 B2 * | 1/2015 | De Koning | ............. | B25J 15/02 294/119.1 |
| 2001/0028175 A1 * | 10/2001 | Thompson | ............. | B25J 15/026 294/119.1 |
| 2014/0125080 A1 * | 5/2014 | Dan | ..................... | B25J 15/0019 294/213 |
| 2014/0207275 A1 * | 7/2014 | Sakano | .................. | B25J 9/1612 700/213 |
| 2015/0343646 A1 * | 12/2015 | Drab | ...................... | B25J 15/026 294/207 |
| 2016/0221188 A1 * | 8/2016 | Nagai | .................... | B25J 9/1612 |

* cited by examiner

*Primary Examiner* — Dean J Kramer
(74) *Attorney, Agent, or Firm* — Rosenberg, Klein & Lee

(57) ABSTRACT

A gripper-mounting mechanism includes an outer shell, a motor unit, a first transmission unit, and a plurality of second transmission units. The outer shell includes spaced-apart first and second walls, and a receiving wall that extends from the second wall toward the first wall and that defines a receiving channel adapted to receive an end effector therein through an opening of the second wall. The first transmission unit includes a transmission gear unit driven by the motor unit. The second transmission units surround the receiving wall. Each of the second transmission units includes a grip member driven movably by the transmission gear unit. The grip members are movable relative to the outer shell toward or away from each other.

18 Claims, 11 Drawing Sheets

GRIPPER-MOUNTING MECHANISM

FIELD

The disclosure relates to a gripper-mounting mechanism, and more particularly to a gripper-mounting mechanism for convenient assembly of an end effector thereon.

BACKGROUND

A conventional robot hand, such as that disclosed in U.S. Pat. No. 8,388,035, is typically configured with a plurality of movable finger mechanisms for manipulation of a workpiece that is surrounded by the finger mechanisms. With a trend toward miniaturization, an end effector (e.g., a video camera, a suction plate, etc.) may be employed for assisting with the manipulation of the workpiece. However, the end effector may impose a spatial limitation on a workspace available for such manipulation, and an erroneous operation may easily occur due to obstruction of the end effector.

SUMMARY

Therefore, an object of the disclosure is to provide a gripper-mounting mechanism that can alleviate at least one of the drawbacks of the prior art.

According to the disclosure, the gripper-mounting mechanism includes an outer shell, a motor unit, a first transmission unit, and a plurality of angularly spaced-apart second transmission units.

The outer shell includes a first wall and a second wall that are spaced apart from each other and that cooperatively define an accommodating space, and a receiving wall that extends from the second wall toward the first wall and that defines a receiving channel extending along a first axis and adapted to receive an end effector therein. The second wall has an opening which spatially communicates with the receiving channel and which is adapted for insertion of the end effector therethrough into the receiving channel. The motor unit is disposed in the accommodating space. The first transmission unit includes a transmission gear unit that is disposed in the accommodating space and that is driven by the motor unit to rotate about the first axis. The second transmission units surround the receiving wall. Each of the second transmission units includes a grip member that is driven movably by the transmission gear unit relative to the outer shell. The grip members of the second transmission units are movable relative to the outer shell toward or away from each other.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
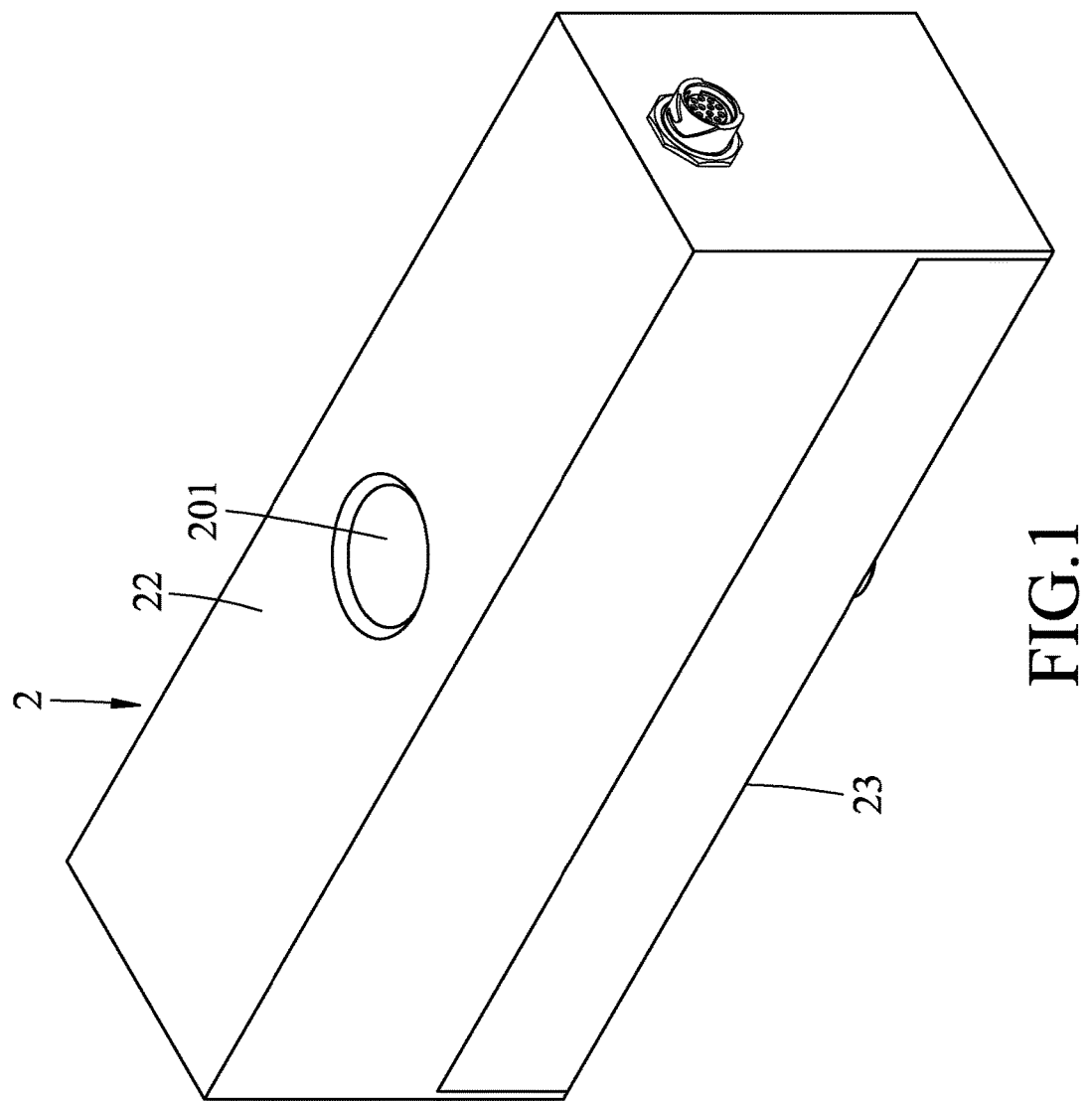
FIG. 1 is a perspective view illustrating a first embodiment of a gripper-mounting mechanism according to the disclosure mounted with an end effector.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
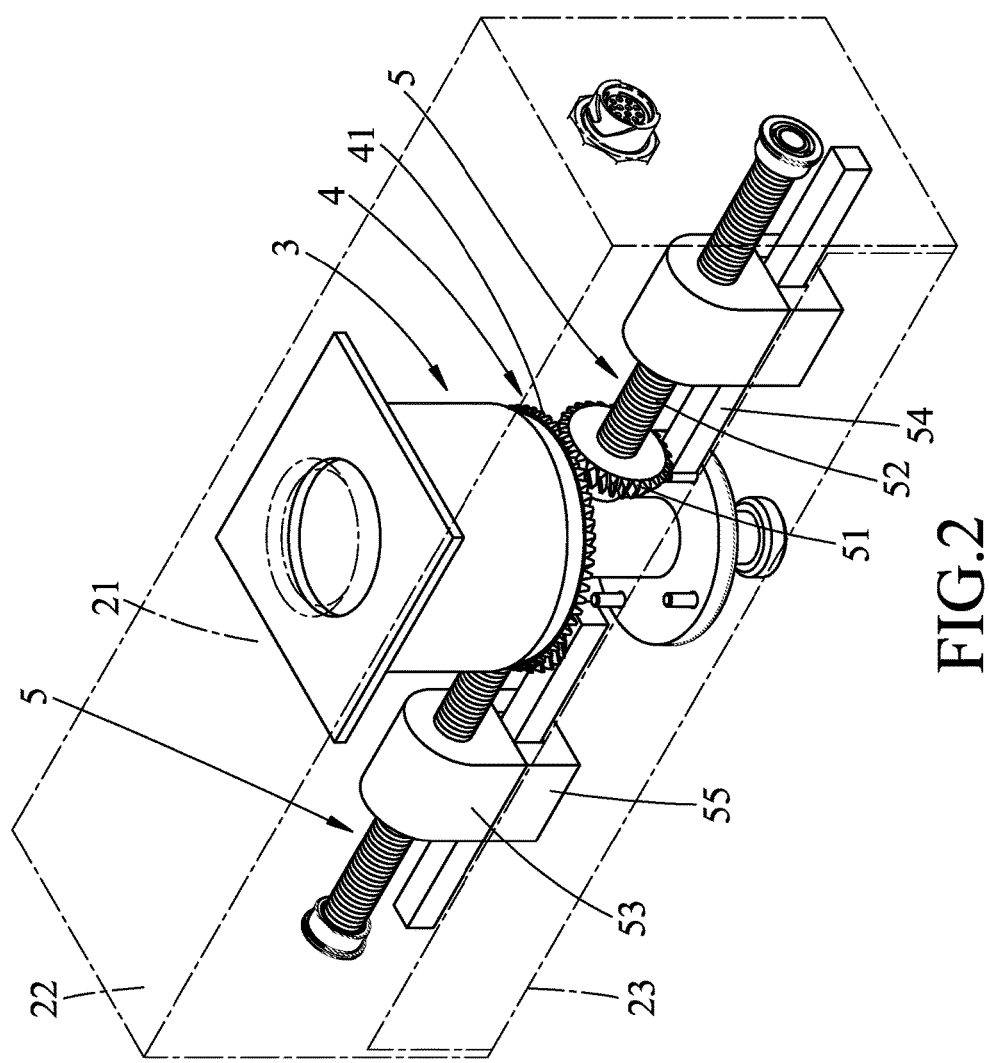
FIG. 2 is a schematic perspective view of a motor unit, a first transmission unit, and a second transmission unit of the first embodiment and the end effector.
Figure 3:
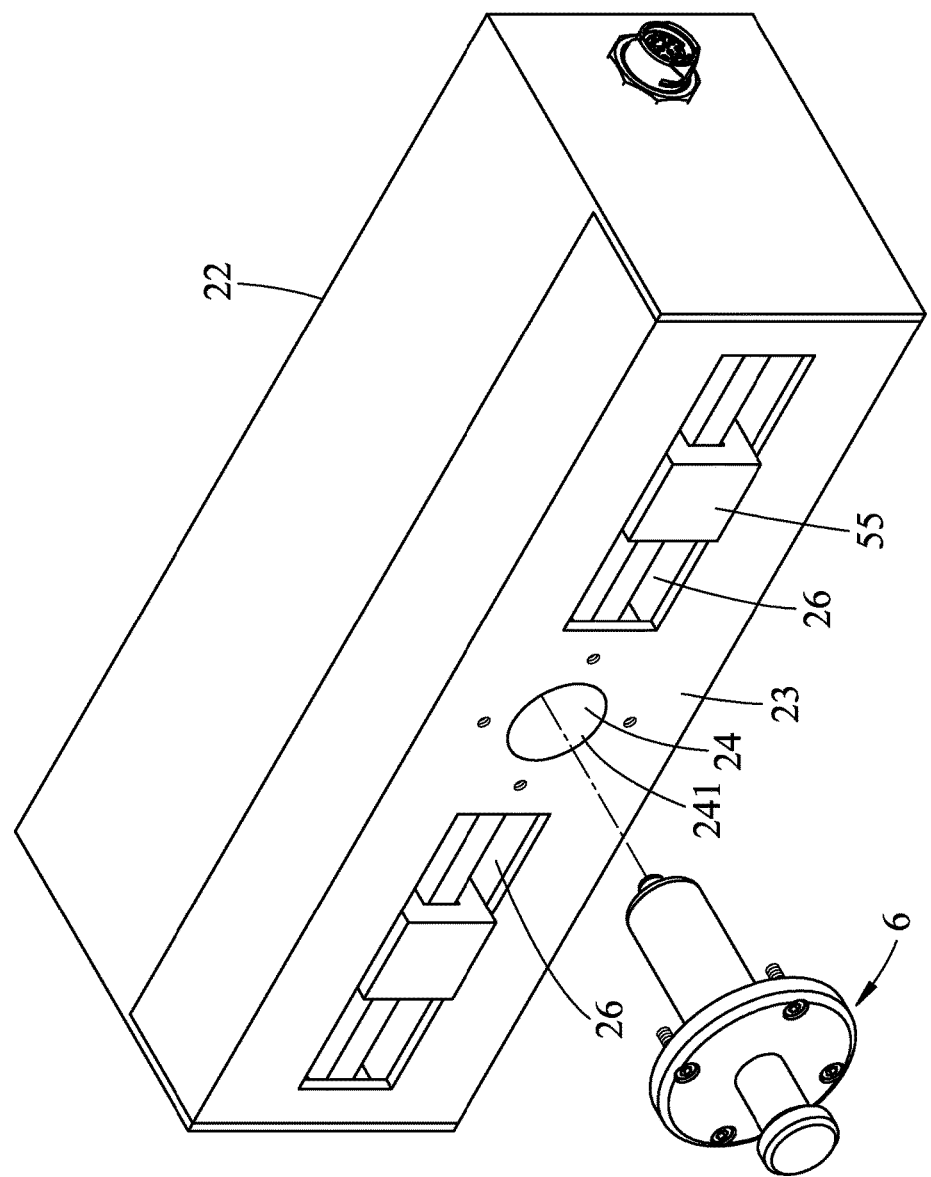
FIG. 3 is a partly exploded perspective view of the first embodiment and the end effector.

Referring to FIGS. 1 to 3, a first embodiment of a gripper-mounting mechanism according to the disclosure includes an outer shell 2, a motor unit 3, a first transmission unit 4, and two angularly spaced-apart second transmission units 5.

Figure 4:
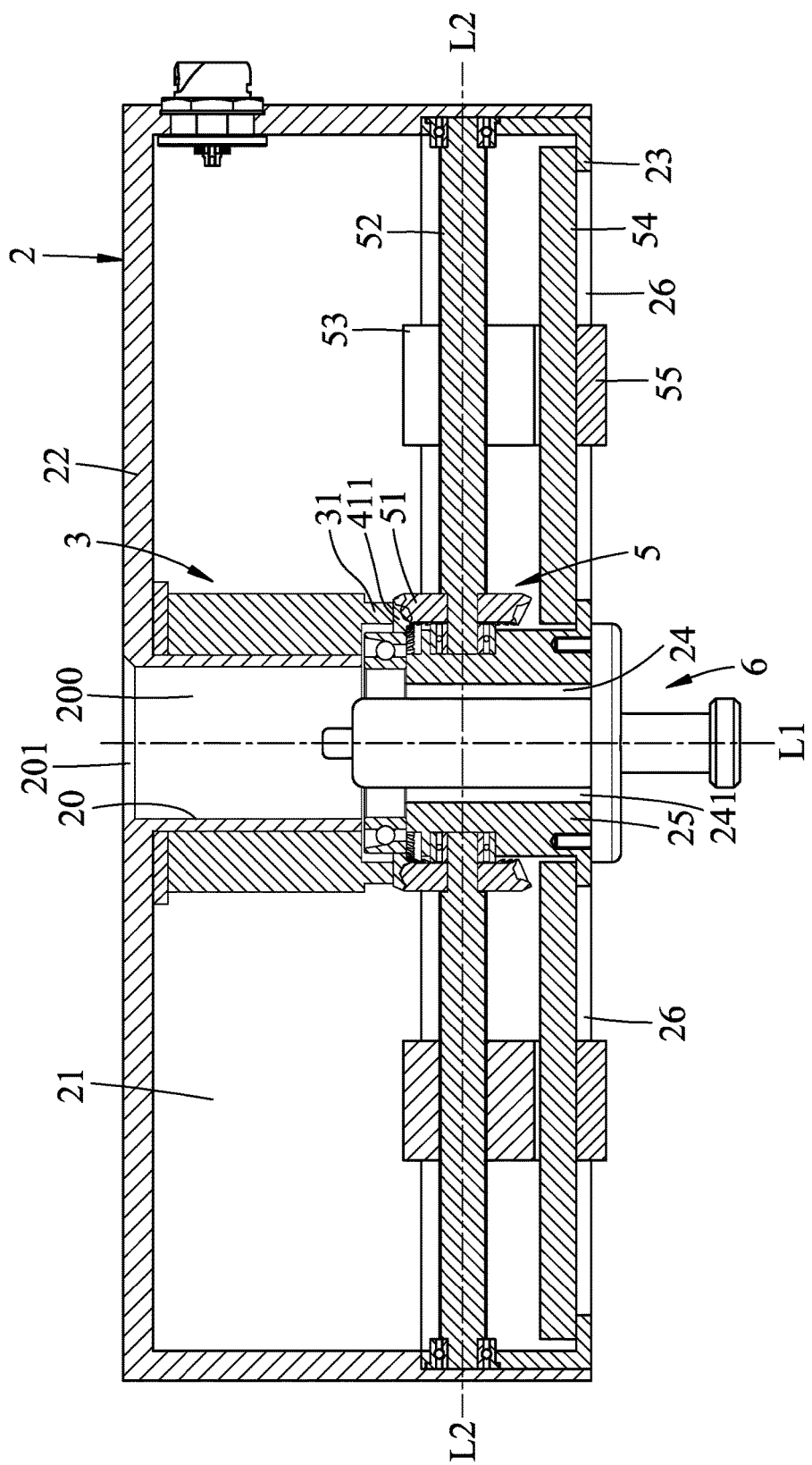
FIG. 4 is a schematic partly sectional view of the first embodiment and the end effector.

With further reference to FIG. 4, the outer shell 2 includes a first wall 22, a second wall 23, a receiving wall 25, and an extension wall 20. The first and second walls 22, 23 are spaced apart from each other and cooperatively define an accommodating space 21. The receiving wall 25 extends from the second wall 23 toward the first wall 22, and defines a receiving channel 24 extending along a first axis (L1) and adapted to receive an end effector 6 therein. The extension wall 20 extends along the first axis (L1) from the first wall 22 toward the receiving wall 25, and defines an extension channel 200 communicating spatially with the receiving channel 24. The first wall 22 has an opening 201 which spatially communicates with the extension channel 200. The second wall 23 has an opening 241 which spatially communicates with the receiving channel 24 and which is adapted for insertion of the end effector 6 therethrough into the receiving channel 24, and two spaced-apart slots 26 which are respectively located on opposite lateral sides of the opening 241.

The motor unit 3 is disposed in the accommodating space 21. In this embodiment, the motor unit 3 includes a transmission rotor 31 that is rotatably and securely sleeved on the extension wall 20 of the outer shell 2.

The first transmission unit 4 includes a transmission gear unit 41 that is disposed in the accommodating space 21 and that is driven by the motor unit 3 to rotate about the first axis (L1). The transmission gear unit 41 includes a first bevel gear 411 rotatably surrounding the receiving wall 25 and being driven by the transmission rotor 31.

The second transmission units 5 are equi-angularly spaced apart from each other and surround the receiving wall 25. Each of the second transmission units 5 includes a second bevel gear 51, a threaded shaft 52, a shaft-connecting seat 53, a slide rail 54, and a grip member 55.

The second bevel gear 51 is meshed with the first bevel gear 411 and is rotatable about a second axis (L2) which is transverse to the first axis (L1). The threaded shaft 52 is co-rotatably connected to the second bevel gear 51, extends along the second axis (L2), and is rotatably secured to the outer shell 2. The shaft-connecting seat 53 threadedly engages the threaded shaft 52. The slide rail 54 is disposed in the outer shell 2 and extends parallel to the threaded shaft 52. The grip member 55 is slidably disposed on the slide rail 54 and is fixedly connected to the shaft-connecting seat 53. Such configuration permits the grip member 55 to be driven movably relative to the outer shell 2 by the transmission gear unit 41 via the engagement between the first bevel gear 411 of the transmission gear unit 41 and the second bevel gear 51. That is, the grip members 55 of the second transmission units 5 are slidable respectively along the slide rails 54 to move toward or away from each other relative to the outer shell 2. In this embodiment, the second axis (L2) is perpendicular to the first axis (L1), and the grip members 55 are disposed at and movable along the slots 26, respectively.

More specifically, during operation, the transmission rotor 31 of the motor unit 3 drives rotation of the first bevel gear 411 to rotate the second bevel gears 51 and the threaded shafts 52 about the second axis (L2). Rotation of the threaded shafts 52 drives the shaft-connecting seats 53 to move along the second axis (L2) to thereby drive sliding movement of the grip members 55 along the respective slide rails 54. When each of the grip members 55 is mounted with a finger member to constitute a finger mechanism, the finger members can cooperate with each other to manipulate a workpiece (not shown) by the movement of the grip members 55. It should be noted that the number of the second transmission units 5 is not limited to be two, and may be three, four, five, . . . , etc. depending on actual applications.

In this embodiment, the end effector 6 is an electric cylinder. In other embodiment, the end effector 6 may be a video camera, a suction plate, an electromagnet, an air gun, a sensor, or other device that may assist with the manipulation of the workpiece.

It is worth mentioning that in actual use, electric wires of the motor unit 3 and the end effector 6 can extend out of the outer shell 2 through the opening 201 of the first wall 22, thereby eliminating messy wirings and creating a neat appearance.

Figure 5:
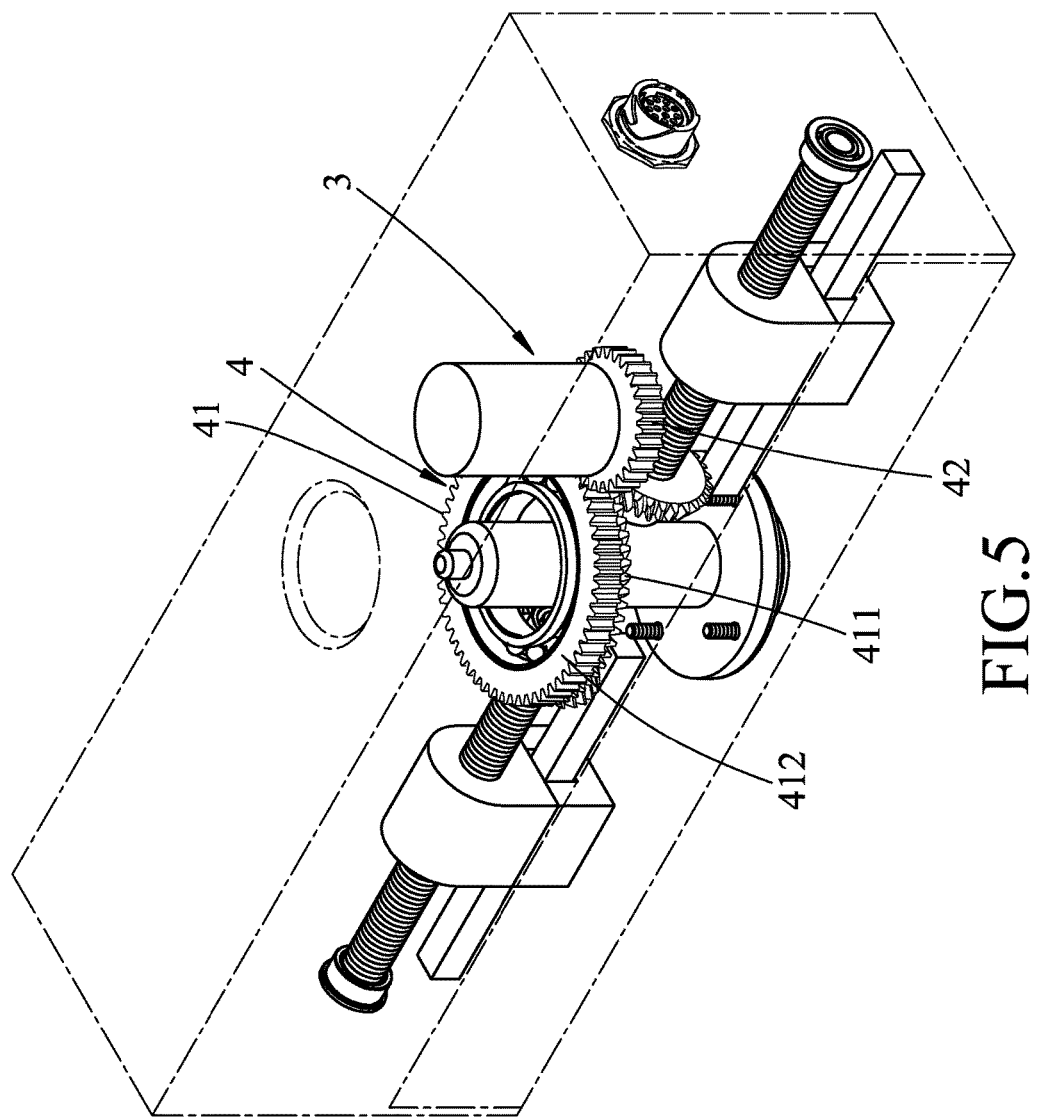
FIG. 5 is a schematic perspective view illustrating a second embodiment of the gripper-mounting mechanism according to the disclosure mounted with an end effector, in which an outer shell of the second embodiment is indicated by phantom line.
Figure 6:
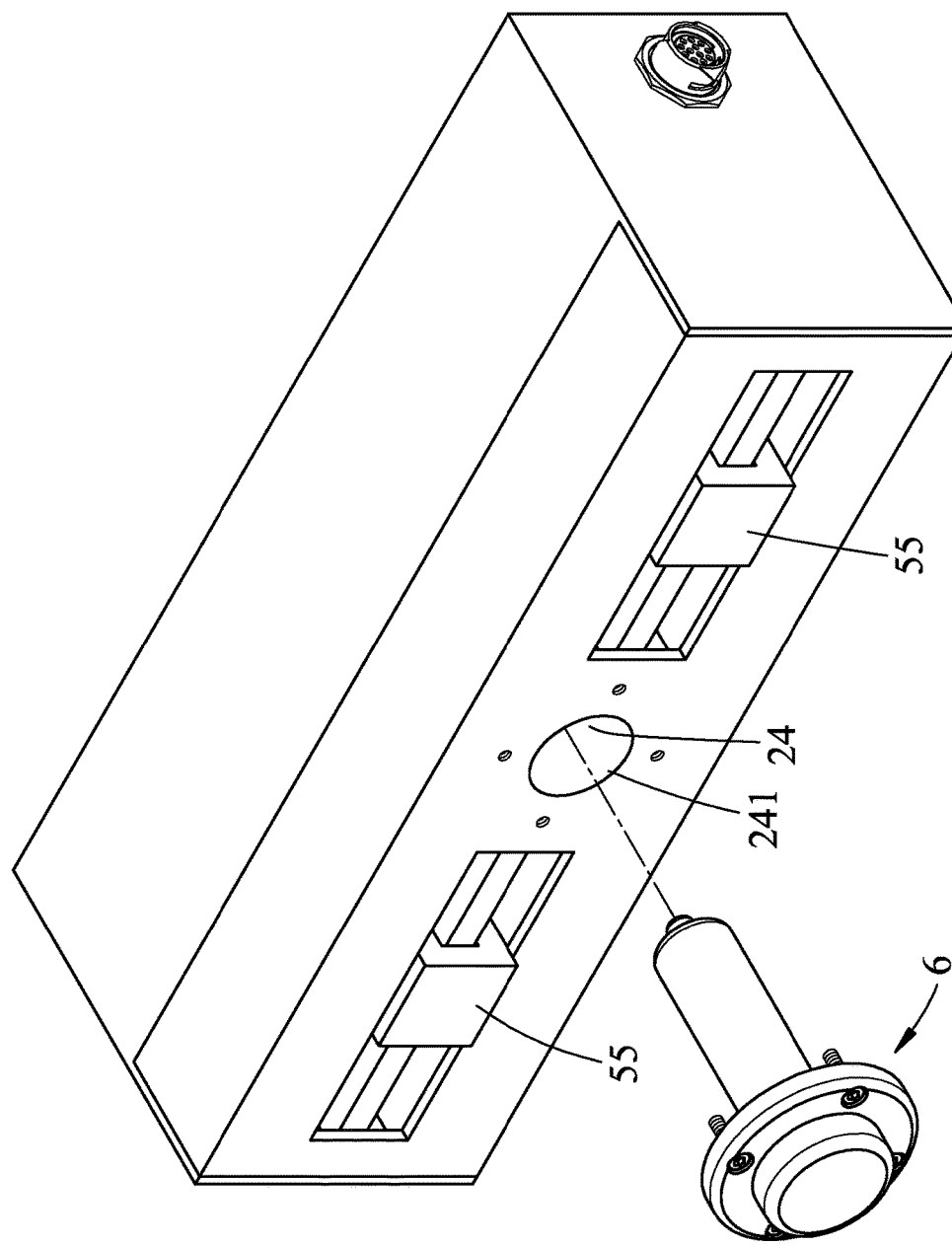
FIG. 6 is a partly exploded perspective view of the second embodiment and the end effector.
Figure 7:
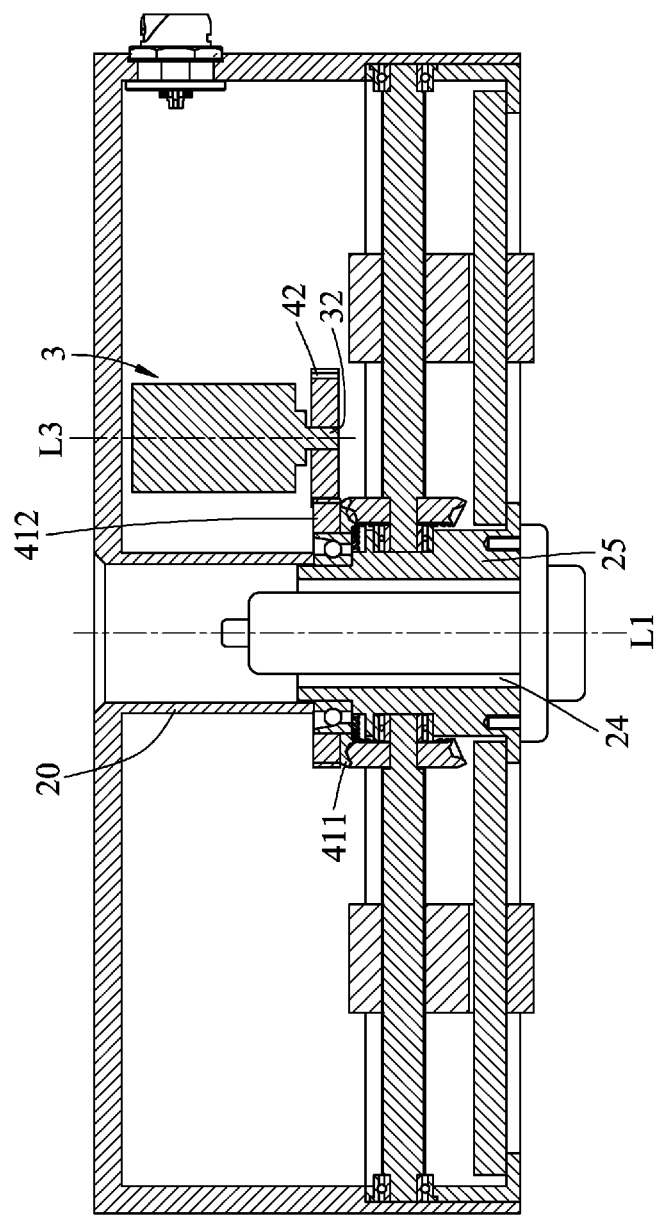
FIG. 7 is a schematic partly sectional view of the second embodiment and the end effector.

Referring to FIGS. 5 to 7, a second embodiment of the gripper-mounting mechanism according to the disclosure is similar to the first embodiment. The difference between the first and second embodiments resides in that the motor unit 3 of the second embodiment is disposed on a side of the receiving wall 25, and includes an output shaft 32 that is rotatable about a rotation axis (L3). The first transmission unit 4 of the second embodiment further includes a drive gear 42 that is co-rotatably coupled to the output shaft 32. The transmission gear unit 41 of the second embodiment further includes a driven gear 412 rotatably surrounding the receiving wall 25 and being meshed with the drive gear 42. The first bevel gear 411 is co-rotatably coupled to the driven gear 412 so as to be driven by the motor unit 3 to drive the movement of the grip members 55. In this embodiment, the rotation axis (L3) is parallel to the first axis (L1), and the end effector 6 is a video camera.

During operation, the motor unit 3 drives rotation of the output shaft 32 about the rotation axis (L3) to rotate the drive gear 42 to thereby drive rotations of the driven gear 412 and the first bevel gear 411 about the first axis (L1) for the movement of the grip members 55.

It should be noted that in a variation of this embodiment, the drive gear 42 and the driven gear 412 may be substituted by a transmission mechanism without a gear-type structure, such as a plurality of rollers trained with belts.

Figure 8:
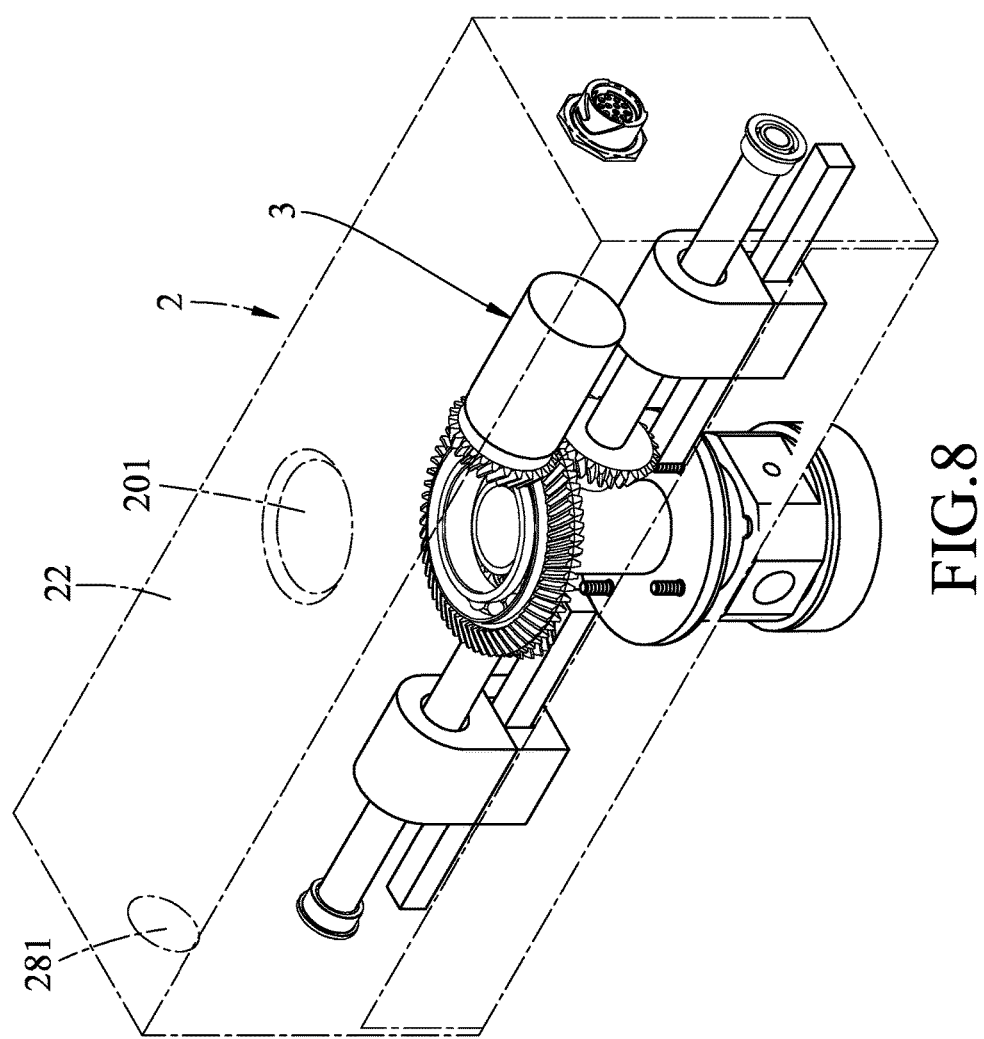
FIG. 8 is a schematic perspective view illustrating a third embodiment of the gripper-mounting mechanism according to the disclosure mounted with an end effector, in which an outer shell of the third embodiment is indicated by phantom line.
Figure 9:
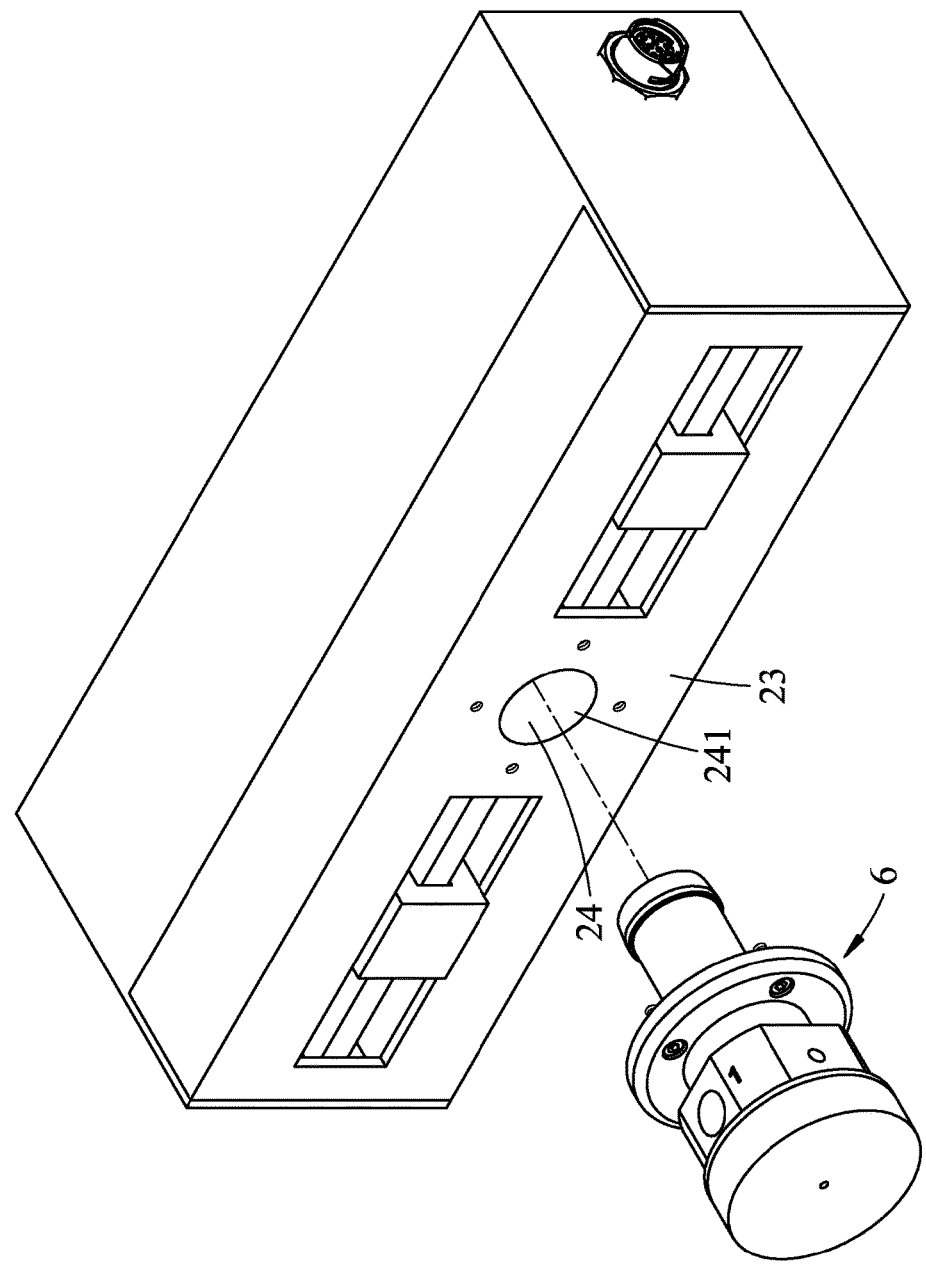
FIG. 9 is a partly exploded perspective view of the third embodiment and the end effector.
Figure 10:
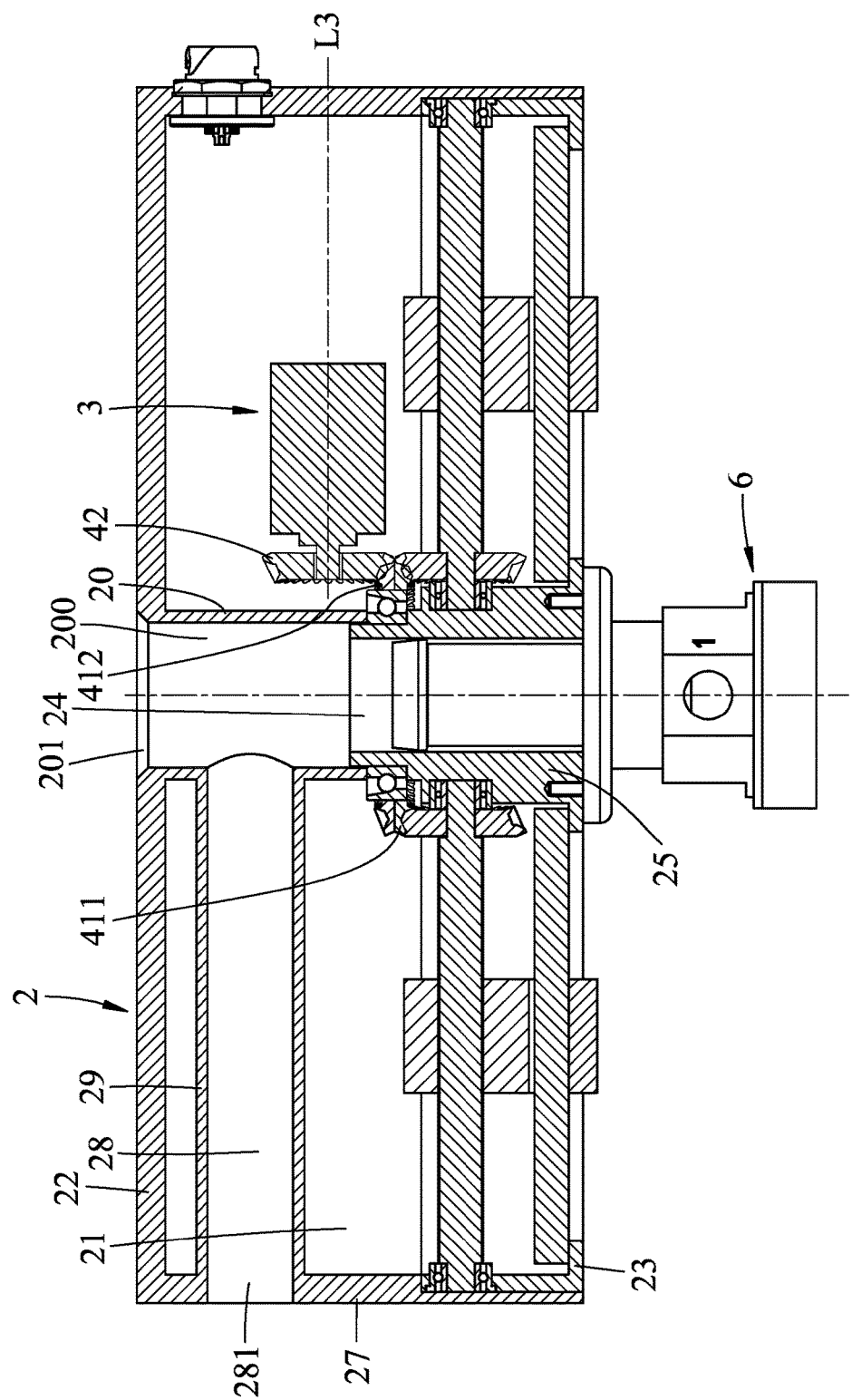
FIG. 10 is a schematic partly sectional view of the third embodiment and the end effector.

Referring to FIGS. 8 to 10, a third embodiment of the gripper-mounting mechanism according to the disclosure is similar to the second embodiment. The difference between the second and third embodiments resides in that in the third embodiment, the rotation axis (L3) is perpendicular to the first axis (L1), and the drive gear 42 and the driven gear 412 are configured as bevel gears. The outer shell 2 of the third embodiment further includes a third wall 27 that interconnects the first and second walls 22, 23 and that serves as a border of the accommodating space 21, and a channel-defining wall 29 that extends from the third wall 27 toward the extension wall 20 and that defines a side channel 28 spatially communicating with the extension channel 200. The third wall 27 has an opening 281 that spatially communicates with the side channel 28. Such configuration may achieve the same function as the second embodiment. In addition, the electric wirings of the motor unit 3 and the end effector 6 can extend out of the outer shell 2 through the opening 201 of the first wall 22 or the opening 281 of the third wall 27, thereby eliminating messy wirings and creating a neat appearance. In this embodiment, the end effector 6 is a suction plate.

Figure 11:
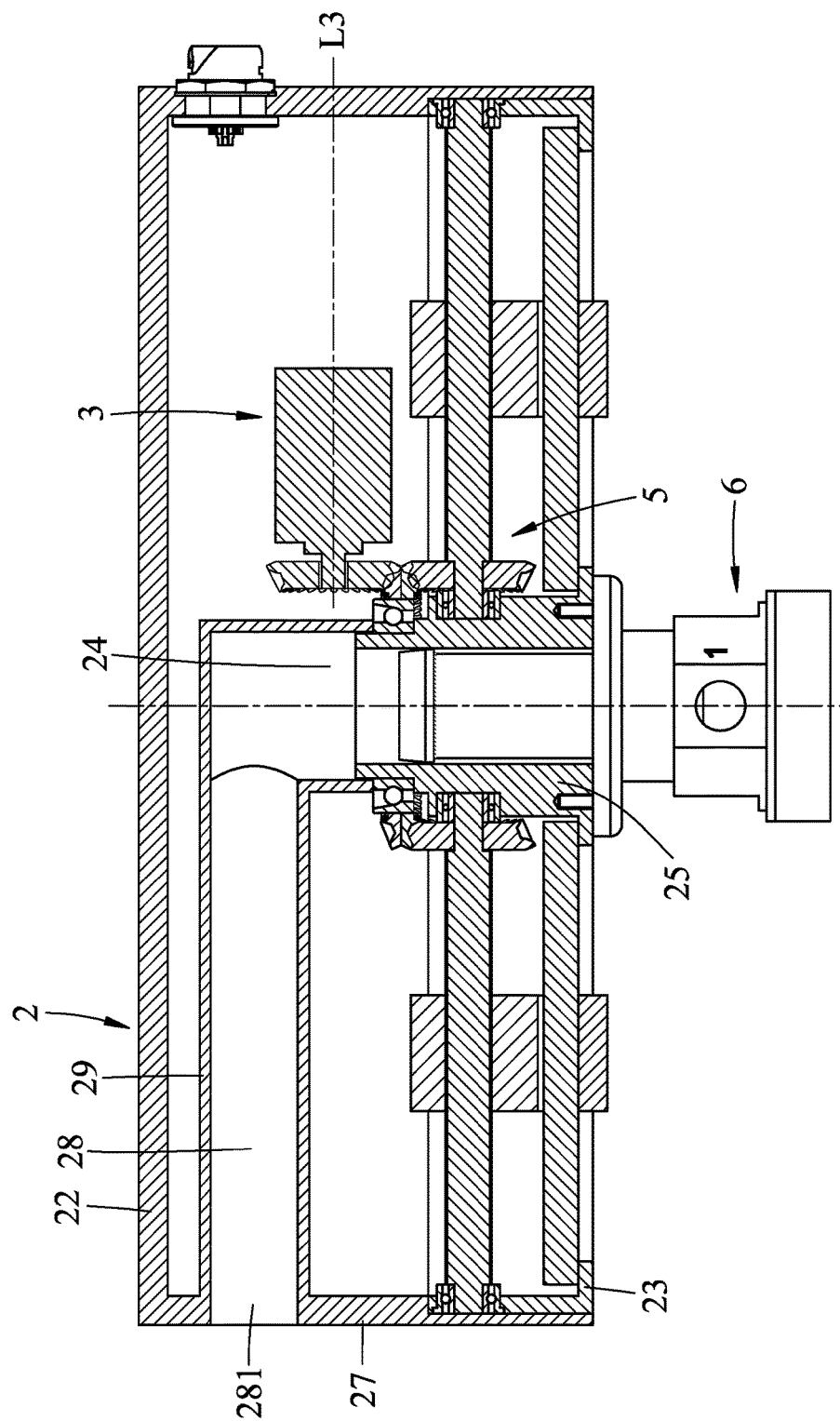
FIG. 11 is a schematic partly sectional view illustrating a fourth embodiment of the gripper-mounting mechanism according to the disclosure mounted with an end effector.

Referring to FIG. 11, a fourth embodiment of the gripper-mounting mechanism according to the disclosure is similar to the third embodiment. The difference between the third and fourth embodiments resides in that in the fourth embodiment, the extension wall 20 and the opening 201 of the first wall 22 are omitted, the channel-defining wall 29 is L-shaped and extends from the third wall 27 toward the receiving wall 25, and the side channel 28 spatially communicating with the receiving channel 24. In this way, the electric wirings of the motor unit 3 and the end effector 6 can extend out of the outer shell 2 through the opening 281 of the third wall 27, thereby eliminating messy wirings and creating a neat appearance.

In summary, by virtue of the configuration of the second transmission units 5 surrounding the receiving wall 25 and the design of the receiving channel 24 and the opening 241 of the second wall 23, the end effector 6 can be easily and conveniently mounted onto the gripper-mounting mechanism, and may assist with the manipulation of the workpiece without causing obstruction.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hollow gripper mechanism comprising:
   an outer shell including a first wall and a second wall that are spaced apart from each other and that cooperatively define an accommodating space, and a receiving wall that extends from said second wall toward said first wall and that defines a receiving channel extending along a first axis and adapted to receive an end effector therein, said second wall having an opening which spatially communicates with said receiving channel and which is adapted for insertion of the end effector therethrough into said receiving channel;
   a motor unit disposed in said accommodating space;
   a first transmission unit including a hollow transmission gear unit that is disposed in said accommodating space and that is driven by said motor unit to rotate about the first axis, said hollow transmission gear unit rotatably surrounding a portion of said receiving wall in coaxial alignment therewith; and
   a plurality of angularly spaced-apart second transmission units surrounding said receiving wall, each of said second transmission units including a grip member that is driven movably by said hollow transmission gear unit relative to said outer shell, said grip members of said second transmission units being movable relative to said outer shell toward or away from each other.

2. The hollow gripper mechanism as claimed in claim 1, wherein:
   said outer shell further includes an extension wall that extends along the first axis from said first wall toward said receiving wall and that defines an extension channel communicating spatially with said receiving channel;
   said first wall has an opening that spatially communicates with said extension channel;
   said motor unit includes a transmission rotor that rotatably surrounds said extension wall;
   said hollow transmission gear unit includes a first bevel gear rotatably surrounding said receiving wall and being driven by said transmission rotor; and
   each of said second transmission units further includes a second bevel gear that is meshed with said first bevel gear and that is rotatable about a second axis which is transverse to the first axis for driving the movement of said grip member.

3. The hollow gripper mechanism as claimed in claim 2, wherein each of said second transmission units further includes:
   a threaded shaft which is co-rotatably connected to said second bevel gear and which extends along the second axis;
   a shaft-connecting seat which threadedly engages said threaded shaft and which is fixedly connected to a respective one of said grip members; and
   a slide rail which extends parallel to said threaded shaft and on which the respective one of said grip members is slidably disposed, such that said grip members are slidable respectively along said slide rails to move toward or away from each other.

4. The hollow gripper mechanism as claimed in claim 3, wherein the second axis is perpendicular to the first axis.

5. The hollow gripper mechanism as claimed in claim 2, wherein said outer shell further includes a third wall that interconnects said first and second walls and that serves as a border of said accommodating space, and a channel-defining wall that extends from said third wall toward said extension wall and that defines a side channel spatially communicating with said extension channel, said third wall having an opening that spatially communicates with said side channel.

6. The hollow gripper mechanism as claimed in claim 2, wherein said motor unit is securely sleeved on said extension wall of said outer shell.

7. The hollow gripper mechanism as claimed in claim 1, wherein:
   said outer shell further includes an extension wall that extends along the first axis from said first wall toward said receiving wall and that defines an extension channel communicating spatially with said receiving channel;
   said first wall has an opening that spatially communicates with said extension channel;
   said motor unit includes an output shaft that is rotatable about a rotation axis; and
   said first transmission unit further includes a drive gear that is co-rotatably coupled to said output shaft, said hollow transmission gear unit including a driven gear rotatably surrounding said receiving wall and being meshed with said drive gear, and a first bevel gear rotatably surrounding said receiving wall and co-rotatably coupled to said driven gear so as to be driven by said motor unit to drive movement of said grip members.

8. The hollow gripper mechanism as claimed in claim 7, wherein the rotation axis is parallel to the first axis.

9. The hollow gripper mechanism as claimed in claim 7, wherein the rotation axis is perpendicular to the first axis, said drive gear and said driven gear being configured as bevel gears.

10. The hollow gripper mechanism as claimed in claim 1, wherein said outer shell further includes a third wall that interconnects said first and second walls and that serves as a border of said accommodating space, and a channel-defining wall that extends from said third wall toward said receiving wall and that defines a side channel spatially communicating with said receiving channel, said third wall having an opening that spatially communicates with said side channel.

11. A gripper-mounting mechanism, comprising:
   an outer shell including a first wall and a second wall that are spaced apart from each other and that cooperatively define an accommodating space, and a receiving wall that extends from said second wall toward said first wall and that defines a receiving channel extending along a first axis and adapted to receive an end effector therein, said second wall having an opening which spatially communicates with said receiving channel and which is adapted for insertion of the end effector therethrough into said receiving channel;
   a motor unit disposed in said accommodating space;
   a first transmission unit including a transmission gear unit that is disposed in said accommodating space and that is driven by said motor unit to rotate about the first axis; and
   a plurality of angularly spaced-apart second transmission units surrounding said receiving wall, each of said second transmission units including a grip member that is driven movably by said transmission gear unit relative to said outer shell, said grip members of said second transmission units being movable relative to said outer shell toward or away from each other;

wherein:

said outer shell further includes an extension wall that extends along the first axis from said first wall toward said receiving wall and that defines an extension channel communicating spatially with said receiving channel;

said first wall has an opening that spatially communicates with said extension channel;

said motor unit includes a transmission rotor that rotatably surrounds said extension wall;

said transmission gear unit includes a first bevel gear rotatably surrounding said receiving wall and being driven by said transmission rotor; and each of said second transmission units further includes a second bevel gear that is meshed with said first bevel gear and that is rotatable about a second axis which is transverse to the first axis for driving the movement of said grip member.

12. The gripper-mounting mechanism as claimed in claim 11, wherein each of said second transmission units further includes:

a threaded shaft which is co-rotatably connected to said second bevel gear and which extends along the second axis;

a shaft-connecting seat which threadedly engages said threaded shaft and which is fixedly connected to a respective one of said grip members; and a slide rail which extends parallel to said threaded shaft and on which the respective one of said grip members is slidably disposed, such that said grip members are slidable respectively along said slide rails to move toward or away from each other.

13. The gripper-mounting mechanism as claimed in claim 12, wherein the second axis is perpendicular to the first axis.

14. The gripper-mounting mechanism as claimed in claim 11, wherein said outer shell further includes a third wall that interconnects said first and second walls and that serves as a border of said accommodating space, and a channel-defining wall that extends from said third wall toward said extension wall and that defines a side channel spatially communicating with said extension channel, said third wall having an opening that spatially communicates with said side channel.

15. The gripper-mounting mechanism as claimed in claim 11, wherein said motor unit is securely sleeved on said extension wall of said outer shell.

16. A gripper-mounting mechanism, comprising:

an outer shell including a first wall and a second wall that are spaced apart from each other and that cooperatively define an accommodating space, and a receiving wall that extends from said second wall toward said first wall and that defines a receiving channel extending along a first axis and adapted to receive an end effector therein, said second wall having an opening which spatially communicates with said receiving channel and which is adapted for insertion of the end effector therethrough into said receiving channel;

a motor unit disposed in said accommodating space;

a first transmission unit including a transmission gear unit that is disposed in said accommodating space and that is driven by said motor unit to rotate about the first axis; and a plurality of angularly spaced-apart second transmission units surrounding said receiving wall, each of said second transmission units including a grip member that is driven movably by said transmission gear unit relative to said outer shell, said grip members of said second transmission units being movable relative to said outer shell toward or away from each other;

wherein:

said outer shell further includes an extension wall that extends along the first axis from said first wall toward said receiving wall and that defines an extension channel communicating spatially with said receiving channel;

said first wall has an opening that spatially communicates with said extension channel;

said motor unit includes an output shaft that is rotatable about a rotation axis; and said first transmission unit further includes a drive gear that is co-rotatably coupled to said output shaft, said transmission gear unit including a driven gear rotatably surrounding said receiving wall and being meshed with said drive gear, and a first bevel gear rotatably surrounding said receiving wall and co-rotatably coupled to said driven gear so as to be driven by said motor unit to drive movement of said grip members.

17. The gripper-mounting mechanism as claimed in claim 16, wherein the rotation axis is parallel to the first axis.

18. The gripper-mounting mechanism as claimed in claim 16, wherein the rotation axis is perpendicular to the first axis, said drive gear and said driven gear being configured as bevel gears.

* * * * *